July 12, 1927.
J. C. POTH
1,635,954
DUMPING UNIT FOR MOTOR TRUCKS
Filed March 27, 1925
3 Sheets-Sheet 1
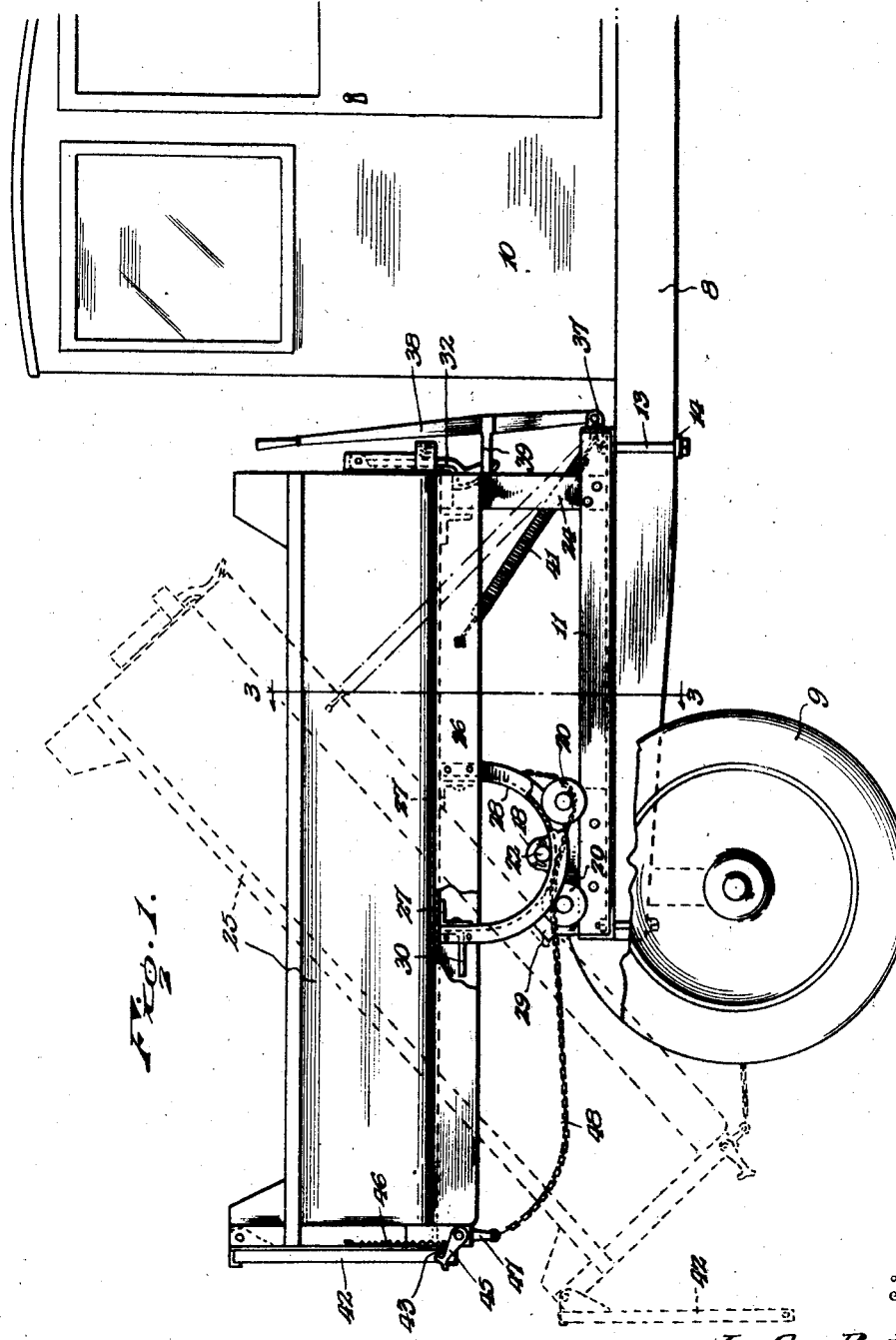
Inventor
J. C. Poth.
By Lacy & Lacy, Attorneys

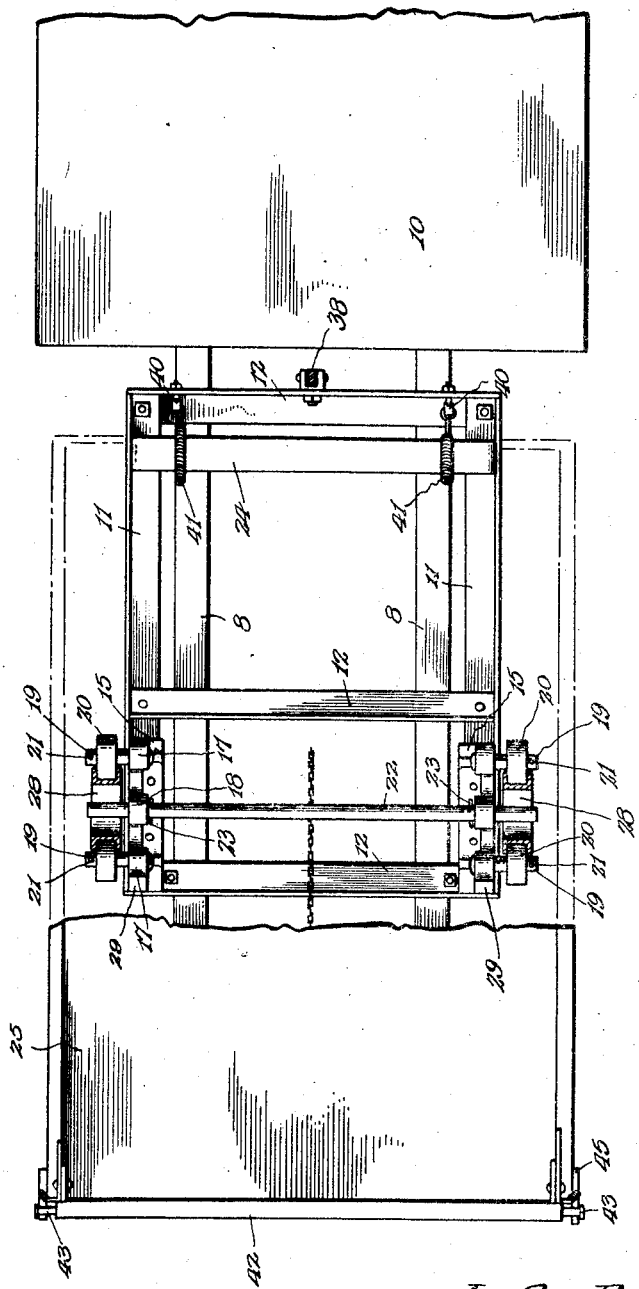

July 12, 1927.
J. C. POTH
1,635,954
DUMPING UNIT FOR MOTOR TRUCKS
Filed March 27, 1925
3 Sheets-Sheet 3
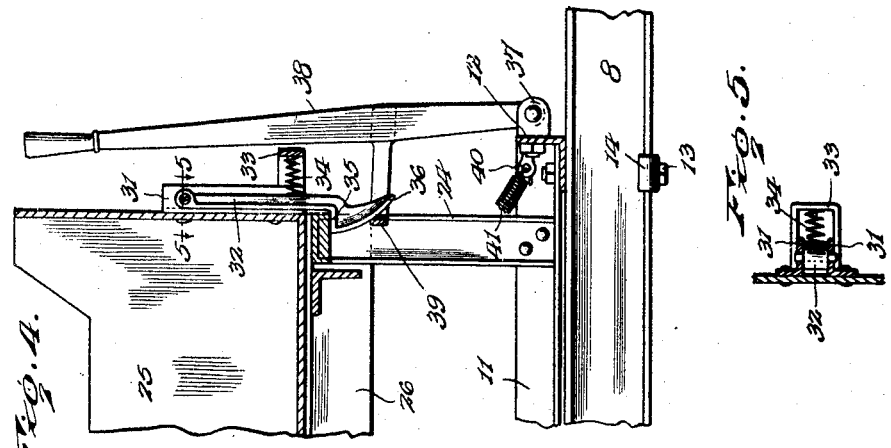
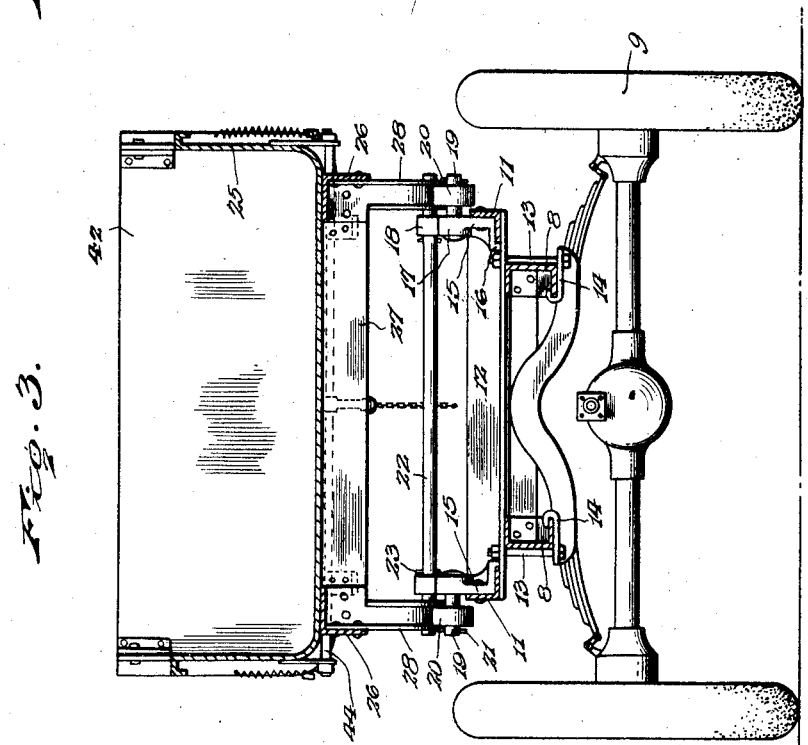
Inventor
J. C. Poth.
By Lacey&Lacey, Attorneys Patented July 12, 1927.

1,635,954

UNITED STATES PATENT OFFICE.

JOHN C. POTH, OF GALION, OHIO.

DUMPING UNIT FOR MOTOR TRUCKS.

Application filed March 27, 1925. Serial No. 18,829.

This invention relates to an improved dumping unit for motor trucks and seeks, among other objects, to provide a unit of this character which may be readily attached to a conventional truck chassis to provide a dumping truck.

The invention seeks, as a further object, to provide a novel mounting for the body whereby the body may be tilted and dumped.

And the invention seeks, as a still further object, to provide a body mounting which will be sturdy and free from mechanical complications and which will support the body for free rocking movement.

Other and less important objects will appear as the description proceeds.

In the accompanying drawings:

Figure 1 is a side elevation showing my improved dumping unit applied to a conventional truck chassis.

Figure 2 is a plan view, parts being broken away and illustrated in section.

Figure 3 is a vertical sectional view showing the mounting of the rockers.

Figure 4 is a detail sectional view showing the catch for securing the body in lowered position.

Figure 5 is a detail sectional view on the line 5—5 of Figure 4, looking in the direction indicated by the arrows.

Referring now more particularly to the drawings, I have, for convenience, shown my improved dumping unit in connection with a conventional truck chassis, the side bars of the frame of which are indicated at 8 and the rear wheels at 9, while a conventional cab is shown at 10. In accordance with the present improvements, I employ a base frame comprising parallel side bars 11 which are connected by front, rear and intermediate cross bars 12 preferably welded to the side bars to afford rigidity. The cross bars 12 rest upon the side bars 8 of the truck chassis and extending through the front and rear cross bars are bolts 13 which carry hooked plates 14 engaged with the side bars 8 of the chassis frame for rigidly securing the base frame thereon.

Fitting in the angles of the side bars 11 of the base frame, at the rear ends of said side bars, are brackets 15 which, as shown in Figure 3, are provided with depending flanges 16 abutting the inner longitudinal edges of said side bars. The brackets are riveted or otherwise secured to the side bars and formed on said brackets are upstanding end bosses 17 between which are provided similar intermediate bosses 18. Fixed in each pair of the bosses 17 are stub shafts 19 upon which are journaled rollers 20, and extending through the outer ends of said shafts are keys 21 limiting the rollers against displacement. Extending through the bosses 18 of the brackets is a removable cross rod 22 projecting at its ends between the pairs of rollers 20, and engaged through said rod to confront the inner sides of the bosses are pins 23 limiting the rod against endwise displacement. Fixed at its ends to the side bars 11 of the base frame near the forward extremities of said side bars is an inverted U-shaped rest 24.

Supported for rocking movement by the pairs of rollers 20 is a body 25. Reinforcing the bottom wall of the body are longitudinal side bars 26 and extending transversely between said side bars is a pair of parallel cross bars 27. Riveted or otherwise secured at their ends to the extremities of said cross bars is a pair of substantially semi-circular rockers 28 resting on the pairs of rollers 20. These rockers are channel-shaped in cross section to snugly receive the rollers so that the rollers will, at all times, follow the rockers while the body is locked against turning movement from side to side, and it is now to be observed that the ends of the cross rod 22 extend over the rockers in close relation thereto. The rod will, therefore, coact with the rockers for limiting the rockers against displacement from the rollers and consequently locking the body upon the base frame.

The body 25 normally bears at its forward end against the rest 24 in horizontal position. Rising from the rear ends of the brackets 15 are inclined stop members 29 and fixed to the end portions of the rear cross bar 27 are stop plates 30 disposed to engage said stop members for limiting the body in its rearward tilting movement. Fixed to the forward end wall of the body is a pair of vertically disposed angle plates 31 and pivoted between said plates, in the manner best shown in Figure 5, is a depending catch 32. Straddling the plates 31 is a U-shaped plate 33 and bearing between said plate and the catch is a spring 34. Near its lower end, the catch is provided with a hook 35 to engage beneath the rest 24 for securing the body in its normal horizontal position, and curving downwardly from the hook is a cam member 36. Thus, when the body is rocked forwardly to its normal position, the cam member 36 will strike the rest 24 for swinging the catch forwardly so that the hook will ride over the rest to be engaged therebeneath by the spring 34. Bolted to the forward cross bar 14 of the base frame is a yoke 37 and pivoted at its lower end in said yoke is an upstanding hand lever 38. Fixed at its ends to opposite sides of said lever is a loop 39 adapted to accommodate the lower end of the cam member 36 of the latch. Accordingly, when the lever is swung forwardly, the loop 39 will coact with said cam member for swinging the latch forwardly and disengaging the hook 35 thereof from beneath the rest 24 to thereby free the body. Secured to the forward cross bar 12 of the base frame near the ends thereof are eye bolts 40 and connected at their lower ends to said bolts are springs 41, the upper ends of which are secured to the forward end portions of the side bars 26 of the body. Thus, when the body is emptied, these springs will tend to return the body to its normal position.

Pivoted at the rear end of the body is a tail gate 42 provided at its ends with pins 43 and journaled at the rear of the body is a cross shaft 44 equipped at its ends with hooks 45. Connected to said hooks are springs 46 which normally hold the hooks engaged with the pins 43 for locking the tail gate closed. Depending from the shaft 44 is a lever 47 and connected at one end to said lever is a chain or other flexible element 48, which is carried forwardly beneath the cross rod 22 and is secured at its opposite end to the forward cross bar 27 of the body. This chain is of such length that when the body is rocked rearwardly, the lever 47 will be swung forwardly by the chain so that the hooks 45 will be rocked downwardly to release the tail gate. Thus, as the rearward tilting of the body continues, the tail gate will automatically gravitate to open position while, when the body is returned, the tail gate will gravitate to closed position to be again secured by said hooks.

As will now be seen in view of the foregoing, the rockers 28 will support the body 25 for free rocking movement so that when the latch 32 is released, as previously described, the body will rock rearwardly to the dotted line position shown in Figure 1, when the body will be limited by the engagement of the stop plates 30 with the stop members 29. Upon the dumping of the load, the body will then be returned by the springs 41 when, as also previously described, the body will be automatically secured by the latch 32. I accordingly provide a particularly effective construction for the purpose set forth and, as will be observed, all of the structure of the unit is carried by the base frame so that a truck may be equipped with the unit simply by attaching the base frame to the chassis frame of the truck.

Having thus described the invention, what I claim is:

1. The combination with a supporting frame and a body mounted to tilt thereon, of pairs of rollers mounted upon the frame in spaced relation, the rollers of each pair being spaced apart and arranged in tandem, channel rockers attached to the body and disposed with the channels facing downwardly and receiving the respective pairs of rollers, and a retaining member mounted upon the frame and engaging over the rockers opposite the spaces between the rollers of the several pairs to hold the rockers thereon and movable to release the rockers and body to admit of ready removal of the latter when required.

2. The combination with a supporting frame including side bars and a body tiltably mounted thereon, of brackets projected upwardly from the side bars, stub shafts projected outwardly from the brackets beyond the side bars, rollers on the outer ends of the stub shafts, channel rockers depending from the sides of the body and receiving the rollers in the channels, and a transverse rod mounted in the brackets and having its ends engaging over the rockers to hold them in place on the rollers, and removable to clear the rockers and admit of displacement of the body when required.

In testimony whereof I affix my signature.

JOHN C. POTH. [L. S.]